United States Patent
Prock et al.

(10) Patent No.: US 10,307,844 B2
(45) Date of Patent: Jun. 4, 2019

(54) SKIVING METHOD AND CORRESPONDING DEVICE

(71) Applicant: Profilator GmbH & Co. KG, Wuppertal (DE)

(72) Inventors: Erich Prock, Ravensburg (DE); Marcel Sobczyk, Solingen (DE)

(73) Assignee: Profilator GmbH & Co. KG, Wuppertal (DE)

( * ) Notice: Subject to any disclaimer, the term of this patent is extended or adjusted under 35 U.S.C. 154(b) by 453 days.

(21) Appl. No.: 15/044,511

(22) Filed: Feb. 16, 2016

(65) Prior Publication Data

US 2016/0158860 A1 Jun. 9, 2016

Related U.S. Application Data

(63) Continuation of application No. PCT/EP2014/066730, filed on Aug. 4, 2014.

(30) Foreign Application Priority Data

Sep. 11, 2013 (DE) .................. 10 2013 109 981

(51) Int. Cl.
*B23F 5/16* (2006.01)
*G05B 19/18* (2006.01)

(52) U.S. Cl.
CPC ............. *B23F 5/163* (2013.01); *G05B 19/186* (2013.01); *Y10T 409/101749* (2015.01); *Y10T 409/105565* (2015.01)

(58) Field of Classification Search
CPC ......... B23F 5/163; Y10T 409/10–409/109699; Y10T 409/105565; Y10T 409/101749

(Continued)

(56) References Cited

U.S. PATENT DOCUMENTS 3,570,367 A * 3/1971 Looman .................. B23F 5/163
  409/34
5,174,699 A * 12/1992 Faulstich ................ B23F 5/163
  409/26

(Continued)

FOREIGN PATENT DOCUMENTS

DE  3915976 A1  11/1990
DE  102008037514 A1  5/2010

(Continued)

OTHER PUBLICATIONS

Article titled "Contemporary Gear Pre-Machining Solutions", by Dr. Ing. Claus Kobialka, from the journal "Gear Solutions", Apr. 2013 edition.*

(Continued)

*Primary Examiner* — Erica E Cadugan
(74) *Attorney, Agent, or Firm* — Whitmyer IP Group LLC

(57) ABSTRACT

A method, and device, for producing gears in gearwheels with a skiving wheel that features cutting teeth, a workpiece spindle for receiving the gearwheel and a tool spindle, wherein the tool and workpiece spindles are positioned at an axial cross-angle relative to one another, wherein the gearing is produced in successive processing steps. Spacewidths between the teeth are incrementally cut deeper. The axial spacing between the tool and workpiece spindles and a turning angle is changed between the processing steps in such a way that a first cutting edge section of the cutting tooth engages on a tooth flank section of a first tooth flank produced during a preceding processing step with an at least reduced material removal referred to other cutting edge sections of this cutting tooth.

13 Claims, 7 Drawing Sheets

(58) Field of Classification Search
USPC .......................................................... 409/1–62
See application file for complete search history.

(56) References Cited

U.S. PATENT DOCUMENTS

| | | | | |
|---|---|---|---|---|
| 2011/0268523 A1* | 11/2011 | Heinemann | ............. | B23F 5/163 409/12 |
| 2012/0177457 A1* | 7/2012 | Nagata | ................... | B23F 5/163 409/26 |
| 2013/0071197 A1* | 3/2013 | Marx | ...................... | B23F 5/163 409/33 |
| 2013/0266391 A1* | 10/2013 | Schweiker | ............. | B23F 5/163 409/51 |
| 2013/0336739 A1* | 12/2013 | Kreschel | ................ | B23F 5/163 409/2 |

FOREIGN PATENT DOCUMENTS

| | | | |
|---|---|---|---|
| EP | 2474379 | A1 | 7/2012 |
| EP | 2570217 | A1 | 3/2013 |
| WO | 2012098002 | A1 | 7/2012 |

OTHER PUBLICATIONS

International Search Report Application No. PCT/EP2014/066730 Completed: Mar. 6, 2015; dated Mar. 17, 2015 6 pages.

* cited by examiner

SKIVING METHOD AND CORRESPONDING DEVICE

TECHNICAL FIELD

The invention pertains to a method for producing gears in gearwheels by means of skiving with a skiving wheel that features cutting teeth, with a workpiece spindle that is rotationally driven about a rotational workpiece axis and serves for receiving the gearwheel, and with a tool spindle that is rotationally driven about a rotational tool axis and carries the skiving wheel, wherein the tool spindle and the workpiece spindle are positioned at an axial cross-angle relative to one another and the drives of the tool spindle and the workpiece spindle are rotationally driven in a predefined speed ratio, wherein the gearing is produced in several successive processing steps, and wherein the spacewidths between the teeth to be produced are incrementally cut deeper with a feed motion having at least one component in the axial direction of the workpiece spindle, during which the axial spacing between the tool spindle and the workpiece spindle changes. The invention furthermore pertains to a device for carrying out this method.

BACKGROUND

A method of the above-described type and a device for carrying out this method are respectively disclosed in DE 10 2008 037 514 A1. The known device features spindle drives and positioning drives that are actuated by an electronic control. In this case, not only the positioning drives, but also the spindle drives are realized in the form of electric motors. When cutting teeth into workpieces by means of skiving, a tool in the form of a skiving wheel is rotationally driven in a continuous fashion. The workpiece, which may consist of a smooth or pre-geared blank, is driven in a predefined speed ratio by a workpiece spindle in such a way that the skiving teeth of the tool engage into the gearing to be produced in a cutting fashion. Due to the axial cross-angle, the skiving teeth engage into the workpiece in a skiving fashion in this case. The feed motion essentially takes place in the axial direction of the workpiece. When a helical gearing is produced, a feed motion in the circumferential direction is additionally superimposed on this feed motion, wherein this is equivalent to the phase position between the workpiece spindle and the tool spindle changing continuously such that, e.g., a gearing extending angular to the axis is produced. In the known skiving method, the gearing is produced in several successive skiving steps, wherein the feed motion essentially remains constant, but the axial spacing is between the individual processing steps changed by way of an infeed such that the spacewidths between the gears to be produced are incrementally cut deeper. In the generic method, the section of the cutting teeth that cut the base of the spacewidth, as well as the sections that cut the two tooth flanks of the spacewidth, are intermittently engaged during a cut. As a result, the effective length of the cutting edge, i.e. the length of the regions of the cutting edge that are simultaneously in cutting engagement, respectively increases or decreases. This means that the effective length of the cutting edge respectively increases or decreases in a relatively abrupt fashion during the skiving pass of the cutting tooth through the spacewidth. At great engagement depths, i.e. in a gearing with large tooth modules or running gears, vibrations therefore occur such that the processing quality is diminished and the service life of the tool is reduced as a result thereof.

EP 2 570 217 A1 describes a skiving method and a corresponding device. In order to produce a gearing, the gearwheel and the skiving wheel are driven in a predefined speed ratio at an axial cross-angle of their rotational axes. The engagement depth of the cutting teeth into the spacewidths lying between two opposing tooth flanks of the gearwheel is incrementally or continuously increased in several successive steps. Once the maximum engagement depth of the cutting teeth has been reached, the tooth flanks are subsequently processed in succession by modifying the turning angle between the skiving wheel and the gearwheel, i.e. their phase position.

DE 39 15 976 A1 also describes a skiving method and a corresponding device. In this case, a rough-machined gearing also is initially produced at the same phase position in a predefined speed ratio between the gearwheel rotation and the skiving wheel rotation. After the maximum engagement depth of the cutting teeth has been reached, the tooth flanks are finished by changing the turning angle between the rotations of the cutting wheel and the gearwheel, e.g., in order to crown the tooth flanks.

SUMMARY

The invention is based on the objective of respectively enhancing the generic method and the generic device such that a superior production result is achieved.

This objective is attained with the invention defined in the claims.

In an incremental processing operation, not only the axial spacing is changed after each processing step, i.e. increased when processing internal gearwheels or decreased when processing external gearwheels, but a turning angle is also incrementally changed during each processing step in association therewith. In this context, the turning angle refers to the angular position of a fixed point on the cutting edge of the cutting tooth relative to a fixed point on the circumferential workpiece surface. In the method according to the initially cited prior art, the spacewidth is cut deeper in each axial position during each cut in the direction of the axial spacing and both spacewidth flanks are symmetrically widened due to the angularly extending lateral sections of the cutting edge whereas the spacewidth is in this method not exactly cut deeper in the direction of the axial spacing. The widening of the spacewidth also does not take place symmetrically during individual successive cuts. When using a cutting tooth, the cutting edge of which has a cutting edge contour corresponding to the finished contour of the spacewidth, the turning angle may be zero during the last processing step or finish-machining step. This type of processing operation preferably begins with a large turning angle that is incrementally reduced as the spacewidth is cut deeper, wherein the absolute value of the turning angle is preferably maximal during the first processing step and incrementally reduced over the course of the further processing steps until it amounts to zero or nearly zero in the last step. If the cutting edge contour of the cutting edge is different, namely smaller, than the finished contour of the spacewidth, the processing operation with an incremental change of the turning angle likewise begins with a maximal turning angle. Over the course of the further processing steps, the turning angle is also incrementally decreased until it assumes it minimal value in the last step. In this type of processing operation, the gear cutting process is completed with two finish-machining steps that are respectively carried out with a positive and a negative minimal turning angle.

The effective length of the cutting edge is significantly influenced in that the axial spacing between the tool spindle and the workpiece spindle and a turning angle between a fixed point such as, e.g., the center of the spacewidth lying between a first and a second tooth flank and a fixed point on the cutting tooth such as, e.g., its center is changed between the processing steps in such a way that a first cutting edge section of the cutting tooth engages on a tooth flank section of a first tooth flank produced during a preceding processing step with an at least reduced material removal referred to other cutting edge sections of this cutting tooth. This material removal may also be zero. The turning angle is changed after a group of processing steps, preferably after each processing step, in such a way that a second cutting edge section, which differs from the first cutting edge section, engages on a tooth flank section of the second tooth flank with an at least reduced material removal referred to other cutting edge sections of this cutting tooth. This material removal may also be zero or nearly zero. According to a preferred variation of the method, it is therefore proposed that the preceding sign of the turning angle is changed after one or more processing steps. If the preceding sign (plus/minus) is changed after each step, the spacewidth flanks can be processed symmetrically, however, not during each individual step, but rather respectively with a double step. In the inventively enhanced method, the effective length of the cutting edge changes much less (as a function of the time) during the skiving pass of the cutting tooth through the spacewidth than in the prior art. In fact, observations and, in particular, calculations showed that the time rate of change of the effective length of the cutting edge steeply increases and also steeply decreases in the method according to the prior art. The change of the effective length of the cutting edge is considered to be the reason for the observed vibrations. The thusly occurring shock motion in the prior art is drastically reduced with the inventive method. According to the preferred variation of the method, it is proposed that the absolute value of the turning angle is in fact incrementally increased or decreased during the infeed in the rotating direction, but the preceding sign of the turning angle should change after a group of processing steps, particularly after each processing step. With this variation, e.g., a left tooth flank is initially processed for a few processing steps and a right tooth flank is subsequently processed for another group of processing steps. In a preferred variation of the method, the preceding sign of the turning angle changes after each processing step. This results in a pendulum-like infeed in the circumferential workpiece direction such that the tooth flank to be processed changes with each processing step. Deepening of the spacewidth, i.e. an infeed in the direction of the axial spacing, may take place during each processing step. However, this is not absolutely imperative in a pendulum-like infeed. The processing of a left flank and the processing of a right flank can take place in direct succession without a change of the axial spacing. The processing preferably begins with a relatively large turning angle, at which a section on the addendum side of the flank to be processed is initially cut clear in a first processing step. A section on the addendum side of the opposite tooth flank is processed in the next processing step. This may take place with a radial infeed or without a radial infeed. According to another potential variation, it is proposed to initially produce a few straight rough-machining cuts, during which the infeed takes place in the radial direction only. The pendulum-like infeed only takes place after these rough-machining cuts have been produced. In both processing steps, the spacewidth is cut deeper as a result of the radial infeed. Consequently, only one of the two tooth flanks is respectively processed during the alternating feed motions. The first and the second tooth flank are preferably processed alternately. In this case, the material removal along this tooth flank respectively only takes place over the length that corresponds to the infeed distance in the direction of the axial spacing. During a pendulum-like processing, both lateral tooth flanks of the cutting tooth engage on the workpiece with a shorter effective length of the cutting edge than in the prior art. In the inventive method, the spacewidth preferably is only incrementally cut deeper and only incrementally widened insignificantly because the absolute value of the turning angle is reduced to zero or nearly zero toward the last processing steps. The last processing step consists of a finish-machining step. This step can be carried out with a zero turning angle such that both tooth flanks are simultaneously processed in this step. However, it is also possible to complete the processing with two finish-machining steps that are carried out with a minimal relative turning angle. In this type of processing, a precision contour can be produced by way of a correction of the respective tooth flank, e.g. by slightly changing the axial spacing continuously during the finish-machining step, such that, for example, a straight tooth flank lies opposite of a slightly conical or crowned tooth flank or a combination thereof. This type of processing is carried out as a precaution against distortion during a heat treatment or for improving properties related to the contact pattern for the subsequent functional the gearing. This finish-machining step may take place with a substantially reduced feed motion or with a reduced infeed such that the volume of material removed per time unit is reduced. The rough-machining steps that precede the finish-machining step are carried out with a short effective length of the cutting edge whereas a long effective length of the cutting edge can be used during the finish-machining step. During the rough-machining steps, the spacewidth essentially can only be incrementally processed in the region of the current base of the spacewidth. During the finish-machining step, the tooth flank is preferably processed/corrected as a whole.

It is considered advantageous that the modified method makes it possible to significantly increase the number of successive processing steps in comparison with the prior art without thereby creating interfering vibrations. In contrast to the prior art, no measures for reinforcing the machine frame have to be taken in order to manage the vibrations. Due to the increased number of cuts, it is possible to increase the cutting speed. All in all, the effective length of the cutting edge is reduced during the entire processing operation. The effective length of the cutting edge changes much less than in the prior art during a pass of the cutting tooth through the spacewidth. This results in a prolonged service life of the tool and in an improved quality of the finished gearing. Gearings with a large tooth module can be produced. It is likewise possible to produce deeper incisions and wider spacewidths.

According to an enhancement of the method, it is proposed to carry out a processing step, in which only at least one tooth flank is processed, but not the base of the tooth, at least after a processing step, in which the spacewidth is cut deeper. In the production of an external gearing, this may be realized by initially reducing the axial spacing during at least one processing step such that the spacewidth is cut deeper and by slightly increasing the axial spacing once again at least during a following processing step such that the cutting teeth do not engage into the base of the spacewidth, but rather only process one of the two tooth flanks as a result of a change of the turning angle. This variation is particularly intended for a finish-machining step. The base of the tooth is defined with the last rough-machining step. In the following finish-machining step, only the tooth flank is processed, but not the base of the tooth. It is particularly proposed to carry out two successive finish-machining steps, in which one tooth flank is initially processed and the other, opposite tooth flank of the spacewidth is processed thereafter. The position of the base of the tooth is preserved as a result of the increased axial spacing during the two finish-machining steps. In the production of an internal gearing, the axial spacing initially is incrementally increased during the rough-machining steps. The axial spacing is then at least slightly decreased during the finish-machining steps.

According to another variation, it is proposed that the turning angle is changed from processing step to processing step in such a way that the tooth flanks form an involute surface. At a fixed turning angle, a cycloidal reference surface is formed during each processing step as a result of the position of the tool relative to the workpiece. The sum of cycloidal reference surfaces forms an involute surface due to a suitable change of the turning angle after each processing step. In this variation of the method, the tooth flank processing does not end with a finish-machining step. The already finished tooth flank is during each processing step merely supplemented by a tooth flank section in such a way that the sum of the tooth flank sections lies in an involute surface or in another specially defined contour.

According to an enhancement of the invention, it is proposed that at least one processing step is carried out with a so-called draw cut. In this case, the material removal direction extends opposite to the feed direction. This requires greater clearance angles on the cutting teeth such that the cutting teeth can engage into the spacewidth without collisions. This processing preferably takes place during a finish-machining step.

The invention furthermore pertains to a device for carrying out this method. The device features a machine frame and at least two spindles that are respectively driven by a driving motor. One spindle is a workpiece spindle and the other spindle is a tool spindle. The tool spindle carries a skiving wheel with cutting teeth. The workpiece spindle serves for receiving a workpiece such as, e.g., a blank to be internally or externally geared. The two spindles are rotationally driven in an essentially predefined speed ratio. For this purpose, the device features an electronic control that not only actuates the drives of the tool spindle and the workpiece spindle, but also positioning drives, by means of which, e.g., the tool spindle can be advanced referred to the axis of the workpiece. The positioning drives furthermore make it possible to incrementally change the axial spacing between the tool spindle and the workpiece spindle. According to the invention, the electronic control is programmed in such a way that the axial spacing is incrementally changed and essentially maintained constant during a processing step in order to produce an internal or external gearing. The control is furthermore programmed in such a way that a turning angle between spacewidth and cutting tooth is also changed in the above-described fashion in addition to the axial spacing after each processing step.

The essence of the method therefore can be seen in that the tooth flanks are in fact processed in succession analogous to the prior art, but essentially only one of the two tooth flanks is alternately processed in association with the incremental increase of the engagement depth. The change between the processing of the two opposite tooth flanks therefore respectively takes place after a slight increase of the engagement depth due to a relative displacement of the cutting teeth within the spacewidth between the teeth of the gearwheel. Consequently, a pendulum-like change takes place between the tooth flanks that are respectively processed with a long cutting edge section of the cutting teeth, wherein the other tooth flank is respectively processed with only a short cutting edge section, and wherein the length of the short cutting edge section essentially corresponds to the increase of the engagement depth and the long cutting edge section is greater than the increase of the engagement depth referred to the preceding processing step such that the effective length of the cutting edge is altogether reduced in comparison with the prior art. The tooth flank being processed preferably changes after each incremental increase of the engagement depth. As a result, the engagement depth is also increased during each change of the tooth flank being processed. According to a preferred enhancement of the invention, it is proposed that the engagement depth is not increased during the last change of the tooth flank being processed because the last two processing steps are finish-machining steps.

BRIEF DESCRIPTION OF THE DRAWINGS

The invention is described in greater detail below with reference to the attached drawings. In these drawings.

DETAILED DESCRIPTION

An internal gearing or an external gearing is cut into a blank by means of a skiving method with the aid of the device described below. This is realized with a skiving wheel 1 that either cuts into a smooth inner or outer surface of a blank or into the spacewidths of an already pre-geared blank. The method comprises a plurality of rough-machining steps that are carried out in succession and in which a rough-machining cut is respectively produced. The plurality of rough-machining steps may be followed by at least one the finish-machining step, in which a finish-machining cut is produced. A finish-machining cut essentially can be distinguished from a rough-machining cut by a reduced infeed, i.e. a reduced material removal, as well as a modified feed rate.

Figure 6:
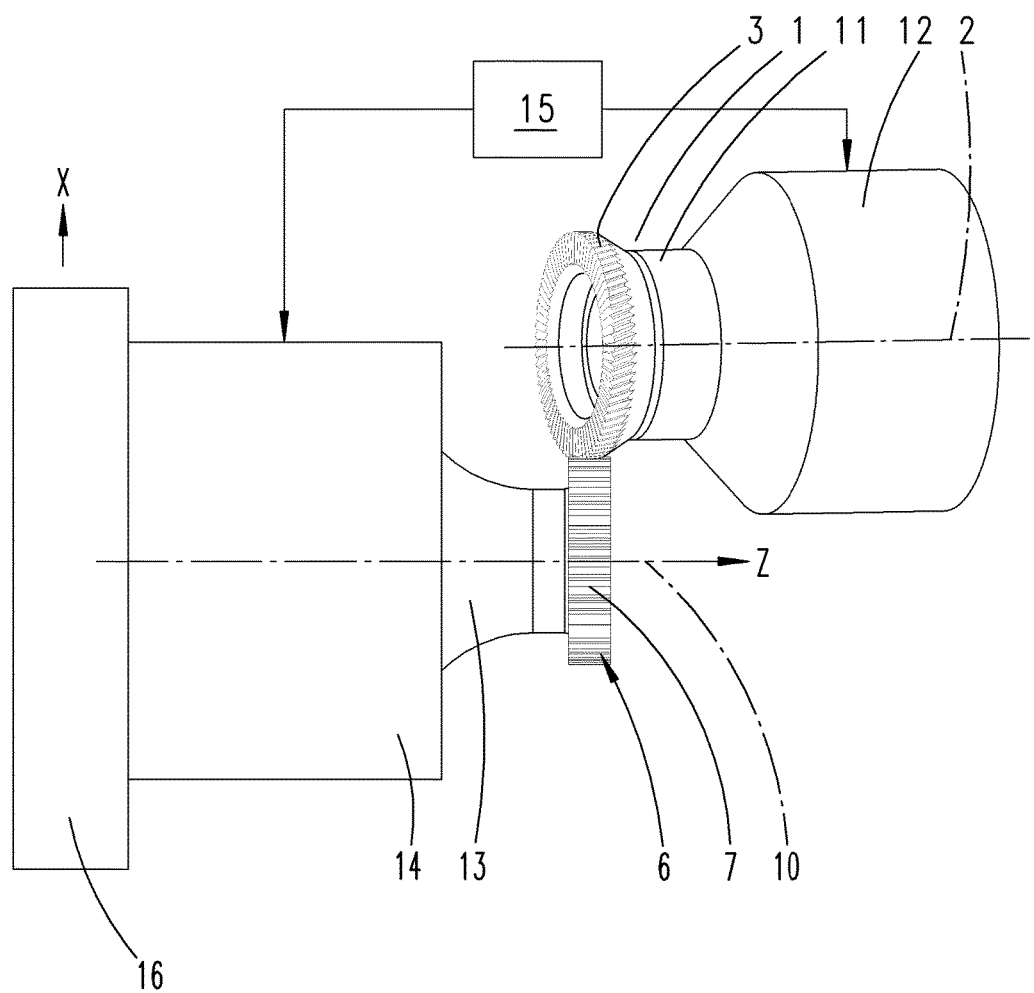
FIG. 6 shows an illustration of the essential elements of an inventive device.

The device illustrated in FIG. 6 features a not-shown machine frame that carries a tool spindle 11 with a chuck, in which a skiving wheel 1 with cutting teeth 3 is fixed. The tool spindle 11 can be rotationally driven by an electromotive drive 12. The drive 12 is controlled by a control unit 15 that operates in accordance with a processing program. The skiving wheel 1 is rotationally driven about the tool axis 2.

A workpiece spindle 13 is seated on the machine frame. This workpiece spindle can be displaced in the X-axis and the Z-axis lying in the plane of projection, as well as in the Y-axis extending perpendicular to the plane of projection, by means of a positioning drive 16. The workpiece spindle 13, which is rotationally driven by a driving motor 14, can be displaced in all directions in space with the aid of the positioning drive 16. This displacement serves for realizing the infeed and the feed motion. A chuck of the workpiece spindle 13 holds the workpiece 6, into which a gearing having spacewidths 7 between its teeth 4, 4' should be machined. In the exemplary embodiment illustrated in FIG. 6, an external gearing is machined into the gearwheel 6. During this process, the workpiece 6 is rotationally driven about the rotational workpiece axis 10 synchronous with the skiving wheel 1. The rotational workpiece axis 10 and the rotational tool axis 2 are aligned relative to one another at a predefined axial cross-angle $\alpha$ such that the cutting edge 5 of the cutting teeth 3 engages into the gearwheel 6 in a skiving fashion. The gearwheel 6 can be geared over its entire length due to a feed motion in the direction of the rotational workpiece axis 10. A spur gearing is produced if the feed motion takes place in the axial direction only. However, a helical gearing is produced if a feed motion in the circumferential direction is superimposed on the feed motion in the axial direction in the form of a continuous change of the phase position.

In an alternative arrangement of the workpiece spindle and the tool spindle of a machine tool, the tool spindle may also be displaceable in all directions in space in order to realize the feed motion. It basically suffices to displace the workpiece spindle and the tool spindle relative to one another along the required axes, wherein the workpiece can, e.g., be moved in the X-direction and the Z-direction and the tool can be moved in the Y-direction.

Figure 1:
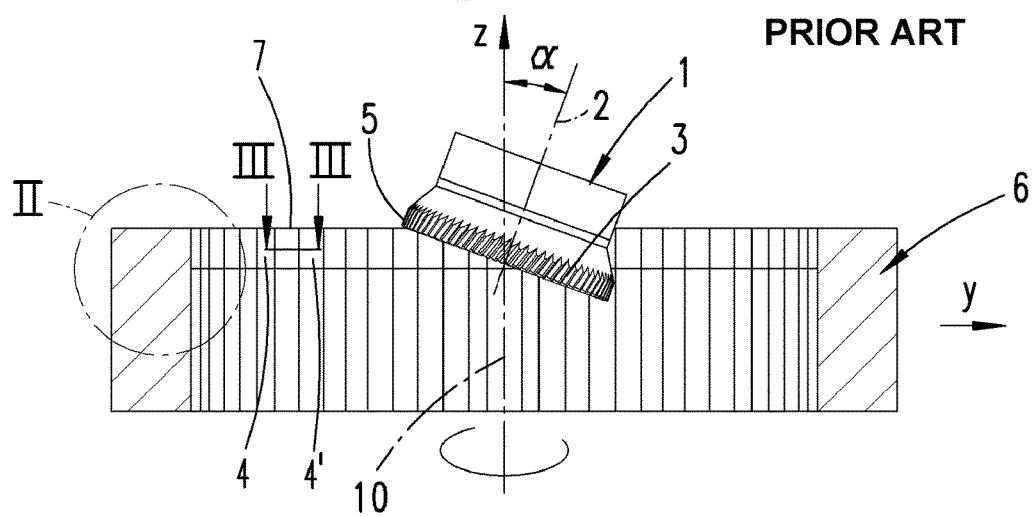
FIG. 1 shows an illustration according to FIG. 2 of DE 10 2008 037 514 A1 in order to elucidate the position of the skiving wheel relative to the gearwheel and the constructive elements.

FIG. 1 shows the axial cross-angle a between the rotational tool axis 2 and the rotational workpiece axis 10. In this case, a hollow gearwheel 6 is provided with an internal gearing having spacewidths 7 between its teeth 4, 4'.

Figure 2:
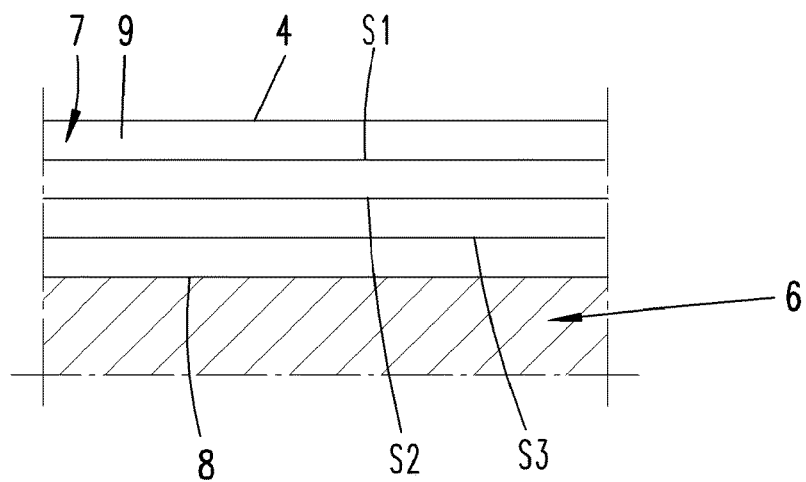
FIG. 2 shows a section through the workpiece in order to elucidate the processing steps.

FIG. 2 shows that the gearing is produced by incrementally cutting the spacewidths 7 deeper. A first deepening cut is produced in a first step S1. The first deepening cut is cut deeper in a processing step S2 by changing the axial spacing between the axes 2, 10. In step S3, the spacewidth 7 is cut even deeper due to a further change of the axial spacing between the axes 2, 10.

Figure 3:
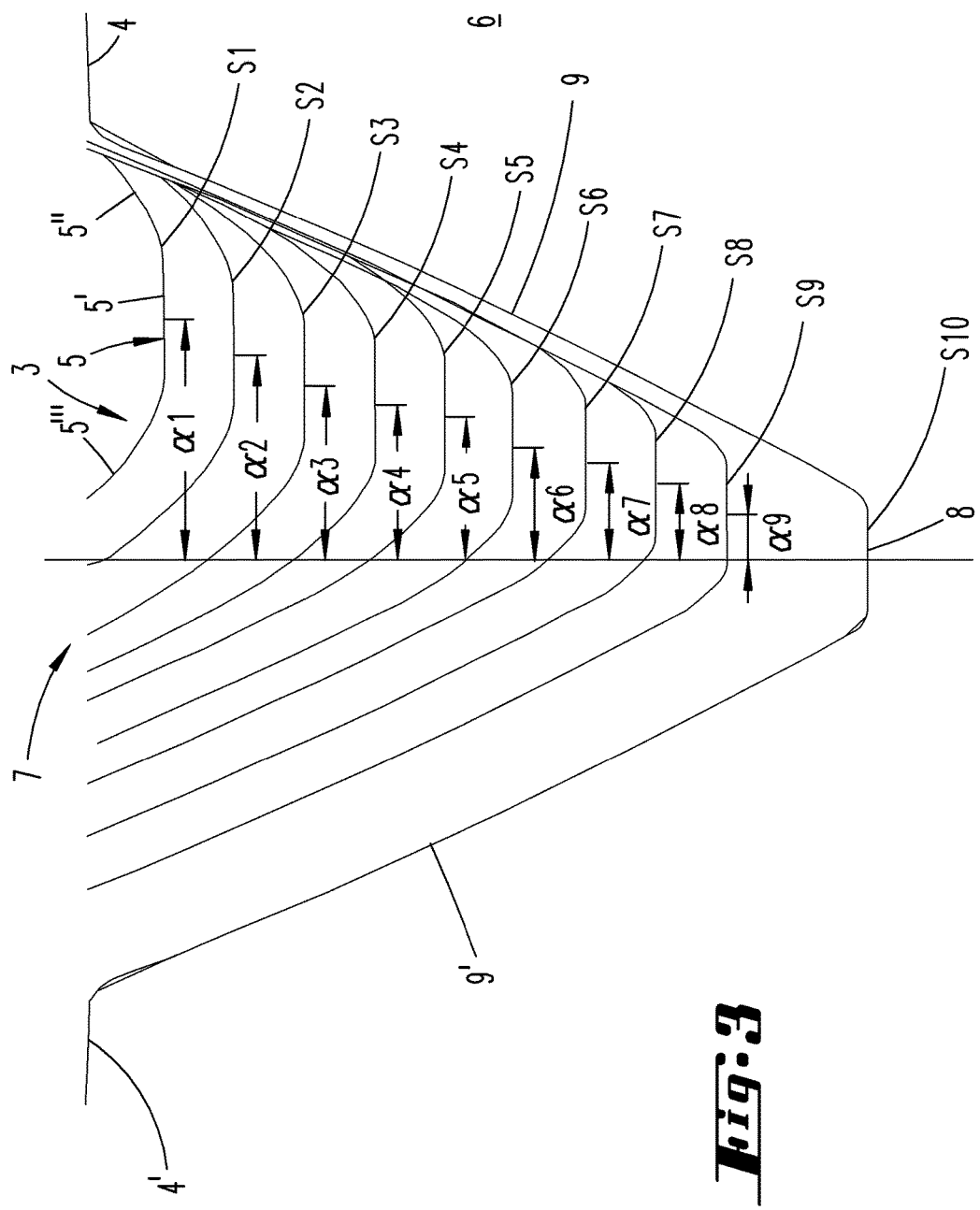
FIG. 3 shows a significantly enlarged illustration of the spacewidth in a gearing of a gearwheel and the relative position of the cutting edge of a cutting tooth in several successive processing steps in order to elucidate the incremental change of the turning angle, wherein the right tooth flank is respectively processed with the cutting tooth as the spacewidth is cut deeper.
Figure 4:
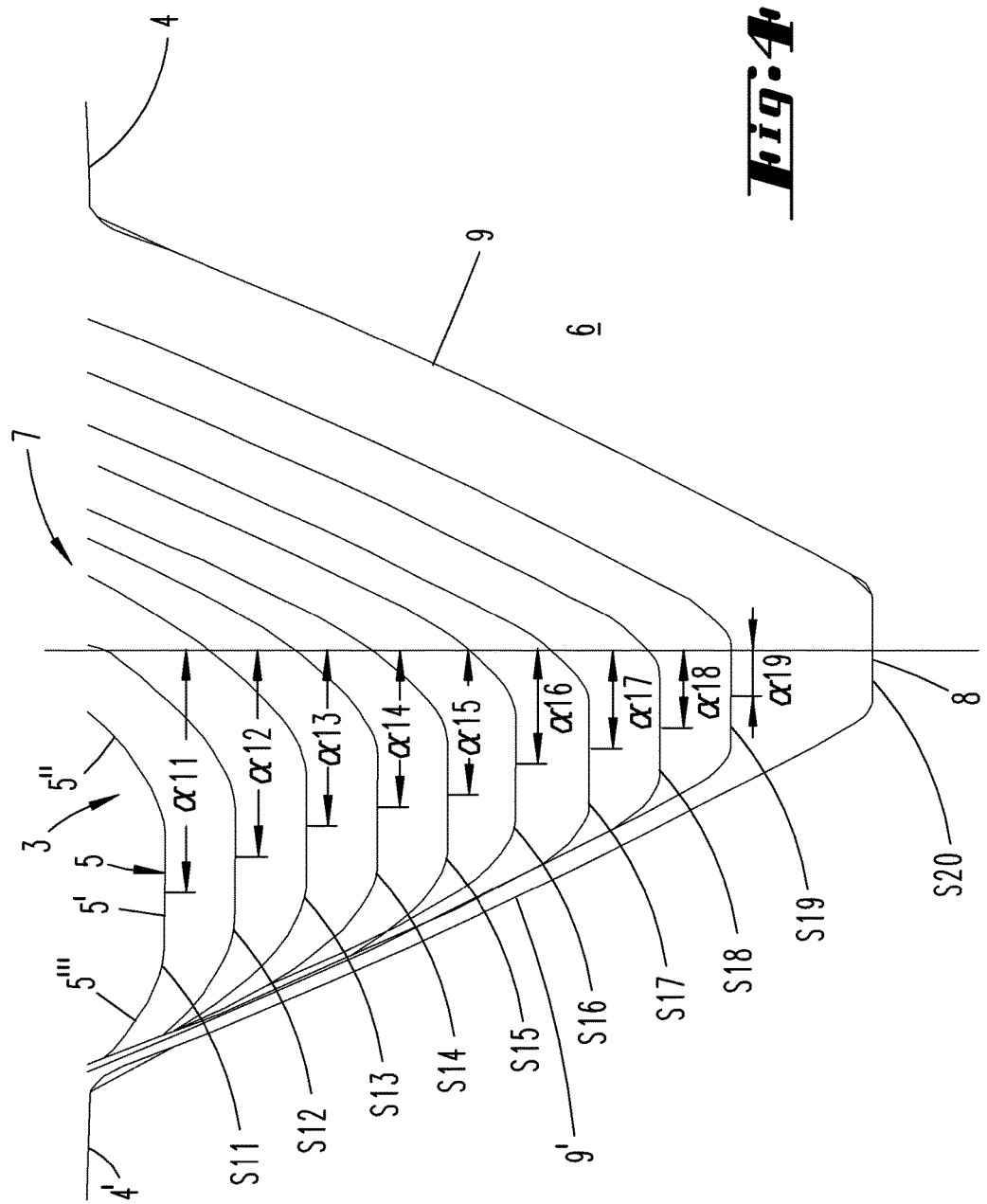
FIG. 4 shows an illustration according to FIG. 3, wherein the left tooth flank is respectively processed with the cutting edge in successive steps during the course of incrementally cutting the spacewidth deeper.

FIGS. 3 and 4 show how a turning angle $\alpha 1$ to $\alpha 19$ is respectively changed from processing step S1 to processing step S20 in addition to the infeed in the direction of the axial spacing that causes the spacewidth 7 to be cut deeper. The last processing step S20 takes place at a zero turning angle and is a finish-machining step carried out with a reduced feed rate.

In this context, the turning angle $\alpha 1$ to $\alpha 20$ refers to the angle of a certain position of the cutting edge 5 of the cutting tooth 3 and its offset relative to a corresponding position of the finished spacewidth 7. In the exemplary embodiment, this concerns the offset between the center of the base 8 of the spacewidth 7 and the center of the cutting edge section 5' of the cutting edge 5 on the side of the tip, which processes both tooth flanks 9, 9' of the spacewidth 7 in the respective last processing step S10 or S20.

The penetration depth of the cutting tooth 3 is minimal in a first processing step S1. During the pass of the cutting edge 5 through the workpiece 6, the cutting edge section 5' extending on the tip of the cutting tooth 3 essentially acts in a deepening fashion. The cutting edge section 5" processes the right tooth flank 9 until it slightly deviates from the finished contour. This slight deviation is removed in the last processing step or the finish-machining step. The tooth flank 5'" cuts into the solid material distant from the finished contour of the left tooth flank 9'. The turning angle $\alpha 1$ has its greatest value during the first processing step S1.

The right tooth flank is then processed in further processing steps S2 to S10 without changing the preceding sign of the turning angle $\alpha$, wherein the turning angle $\alpha 2$ to $\alpha 9$ is incrementally reduced. The turning angle $\alpha 1$ to $\alpha 9$ can be incrementally reduced by a constant amount up to the processing step S10. In this case, the cutting edge sections 5" are only engaged in the region situated adjacent to the section 5' on the side of the tip.

FIG. 4 shows processing steps S11 to S20, during which the cutting edge section 5'" only engages into the workpiece in a material-removing fashion in the region located directly adjacent to the tip section 5' of the cutting edge 5. In contrast, the cutting edge section 5" situated opposite of the cutting edge section 5'" engages into the workpiece in a material-removing fashion over a greater length.

The invention particularly concerns a combination of the respective processing steps S1 to S10 and S11 to S20 illustrated in FIGS. 3 and 4, wherein the processing steps are not carried out in accordance with the numerical sequence, but the left tooth flanks 9' as well as the right tooth flanks 9 are processed up to the respective deepest cut S10 or S20.

In one variation, it is possible, e.g., to carry out a few processing steps, particularly the first processing steps, without a change of the turning angle, i.e. with an infeed in the radial direction only. It is likewise possible to operate with a progressive or degressive feed motion rather than a constant feed motion.

After a group of processing steps such as, e.g., S1 to S4, the preceding sign of the turning angle can be changed such that the processing steps S11 to S14 are carried out immediately after the processing steps S1 to S4. Subsequently, the preceding sign can be changed again such that, e.g., the processing steps S5 to S7 and, after another change of the preceding sign, the processing steps S15 to S17 are carried out. The processing steps S8 and S9 and subsequently the processing steps S8 to S19 can ultimately be carried out followed by the respective finish-machining steps S10 and S20. The absolute value of the respective turning angle $\alpha 1$ to $\alpha 9$ and $\alpha 11$ to $\alpha 19$ is also incrementally decreased in this case, preferably by a constant value. The penetration depth of the cutting edge 5 is also increased incrementally. A cutting edge section 5" or 5'" respectively works at an essentially constant deviation from the finished contour of the left flank 9' of the gearing or the right flank 9 of the gearing. This deviation from the finished contour is removed with the finish-machining cut during the finish-machining step.

However, both flanks 9, 9' can also be processed simultaneously with a last, deepest cut S10 or S20. The turning angle α amounts to zero during this finish-machining step. In this case, the center of the cutting edge section 5' lies in the center of the base 8 of the tooth.

In a variation of the method, in which not only one finish-machining step, but rather two finish-machining steps are carried out and the turning angle during the respective finish-machining step is greater than zero, the right flank 9 is finished in the first finish-machining step and the left flank 9' is finished in the second finish-machining step.

The finish-machining steps may also be corrective steps, by means of which a crowned or conical tooth flank can be produced due to an additional variation of the axial spacing. This can be individually realized differently on the right flank 9 than on the left flank 9'.

It is basically also possible to initially process the right tooth flank 9 in its entirety and to subsequently process the left tooth flank 9' as illustrated in FIGS. 3 and 4, wherein only a segment of the cutting edge section 5" is respectively engaged while the right tooth flank 9 is processed and only a segment of the cutting edge 5'" is respectively engaged while the left tooth flank 9' is processed.

Figure 5:
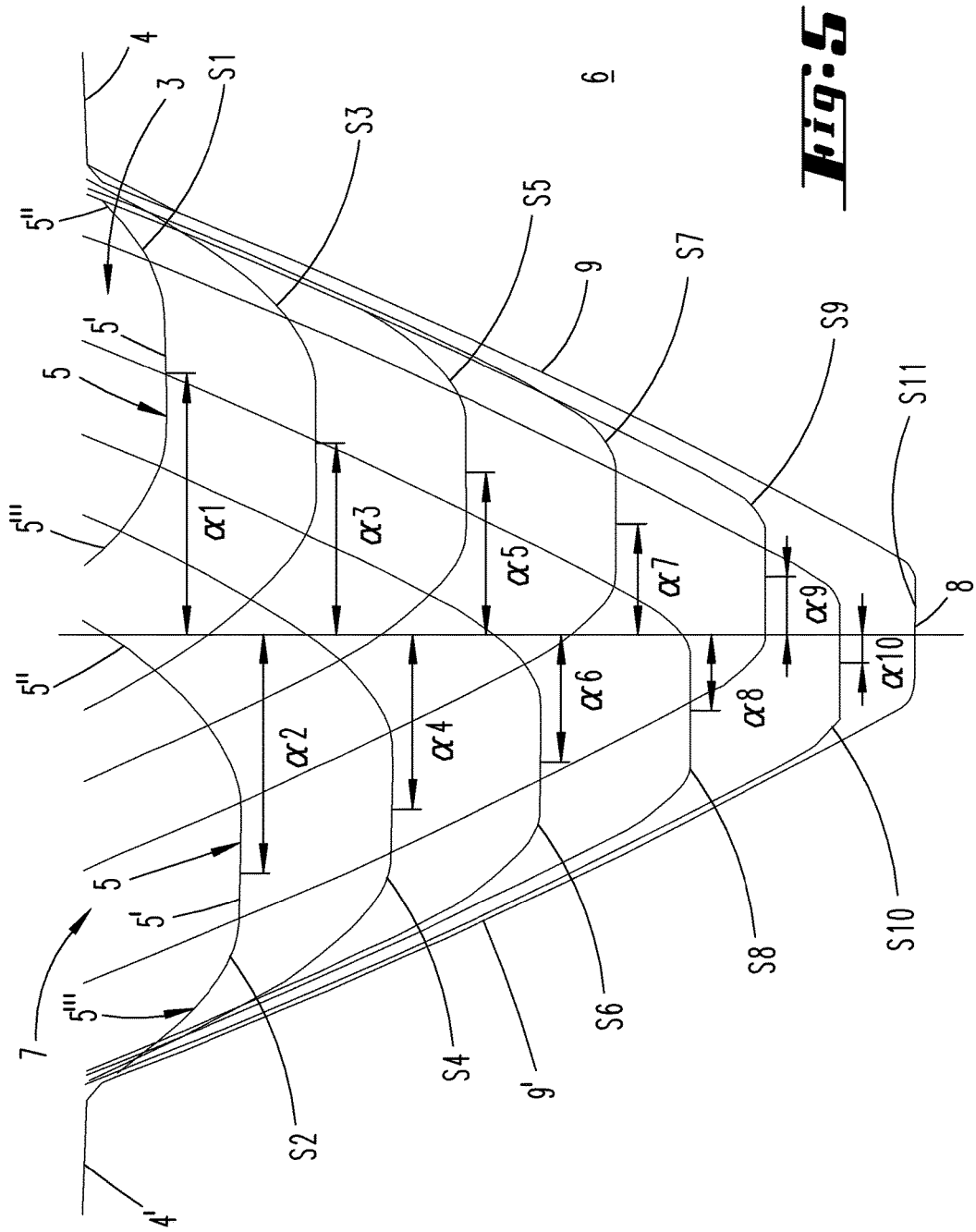
FIG. 5 shows an illustration according to FIG. 3, however, in order to elucidate a method, in which the right tooth flank and the left tooth flank are respectively processed alternately with the cutting edge of a cutting tooth.

FIG. 5 shows a preferred method, in which the cutting edge section 5" processes the preliminary finished contour of the right tooth flank 9 and the tooth flank section 5' essentially penetrates into the workpiece 6 such that the spacewidth is cut deeper in a rough-machining step S1. This step S1 is carried out at a maximal turning angle α1 in the direction of the right flank 9. In the following second rough-machining step S2, the preliminary finished contour of the left tooth flank 9' is processed with the cutting edge section 5'" of the cutting edge 5. The turning angle α2 now points toward the left flank 9', i.e. it has a different preceding sign. The absolute value of the turning angle α2 is smaller than the absolute value of the turning angle α1. The tooth penetration depth is also greater during the processing step S2 than during the processing step S1.

In an alternative variation, the tooth penetration depths in the processing steps S1 and S2 are identical, wherein the absolute values of the respective angular offset α1 and α2 also correspond to one another and merely differ with respect to the preceding sign.

Rough-machining cuts are alternately produced on the right side of the center of the spacewidth 7 (S3, S5, S7, S9, S11) and on the left side of the center of the spacewidth 7 (S2, S4, S6, S8, S10) in a sequence of further alternating rough-machining steps S3 to S11, wherein the absolute value of the turning angle α1 to α10 is respectively decreased incrementally and the penetration depth of the cutting edge 5 into the spacewidth 7 is also respectively increased. In this case, the cutting edge sections 5" respectively process the right tooth flank 9 in the processing steps S1, S3, S5, S7, S9, S11 and the cutting edge sections 5'" process the left tooth flank 9' in the processing steps S2, S4, S6, S8, S10. The spacewidth 7 is incrementally cut deeper with the cutting edge section 5' arranged between the cutting edge sections 5" and 5'".

In a variation, it is also proposed that the infeed in the direction of the axial spacing, i.e. the penetration depth of the cutting edge 5 into the spacewidth 7, is only changed after every second processing step S1, S2; S3, S4; S5, S6; S7, S8 and S9, S10. The infeed by means of the turning angle is in this case realized by merely changing the preceding sign of the turning angle, but its absolute value remains constant.

After this sequence of rough-machining steps S1 to S10, the spacewidth has reached its preliminary finished contour. The reference symbol S11 designates a finish-machining step, in which the final finished contour of both flanks 9, 9' is processed with a finish-machining cut. A correction by means of a superimposed feed motion in the direction of the axial spacing is also possible in this case.

According to one variation, it is proposed that two finish-machining steps are carried out, wherein one finish-machining step is carried out with a minimal positive turning angle and a second finish-machining step is carried out with a minimal negative turning angle in this case.

The rough-machining steps can be respectively carried out while the turning angle is maintained constant and the axial spacing is maintained constant. However, the axial spacing and the turning angle preferably change from rough-machining step to rough-machining step. In the finish-machining step, the axial spacing can also change while the step is carried out.

In a variation of the method, the base 8 of the spacewidth 7 is not cut deeper during all processing steps. With reference to FIGS. 3/4 and 5, the axial spacing between the tool spindle and the workpiece spindle is in this variation changed after one of the processing steps S1 to S9, S11 to S19 or S1 to S19 in such a way that the cutting tooth 3 of the skiving wheel 1 does not penetrate into the base of the tooth 8 and thereby cut the base 8 of the tooth deeper, but rather only the tooth flanks 9, 9' of the spacewidth 7 are processed. In a preferred variation of this method, this processing step, in which the base 8 of the tooth is not processed, is a finish-machining step S10, S20, S11, in which a finish-machining cut is produced that merely removes a chip from one of the flanks 9, 9'. It is preferred to carry out two finish-machining steps, in which only one of the tooth flanks 9, 9' is respectively processed with the corresponding finish-machining cut.

The finish-machining cut produced in one of the above-described finish-machining steps S10, S20, S11 may be a so-called draw cut, during which the feed direction extends opposite to the skiving direction of the cutting teeth 3. In this variation of the method, the cutting edges 5 of the cutting tooth 3 penetrate into the workpiece at an increased entrance angle and emerge from the workpiece at a reduced exit angle.

In another variation of the method, the gearing is produced without a finish-machining step that defines the contour of the tooth flanks 9, 9'. The corresponding finish-machining step or the corresponding finish-machining steps can be omitted if a tooth flank 9, 9', which is composed of several reference surfaces and has an involute shape or the shape of another specially defined profile, is produced with the rough-machining cuts in the rough-machining steps. In this case, the tooth flank consists of reference surfaces that border on one another in the radial direction and extend in a cycloidal fashion. However, the reference surfaces altogether lie in an involute surface or another specially defined contour.

Figure 7:
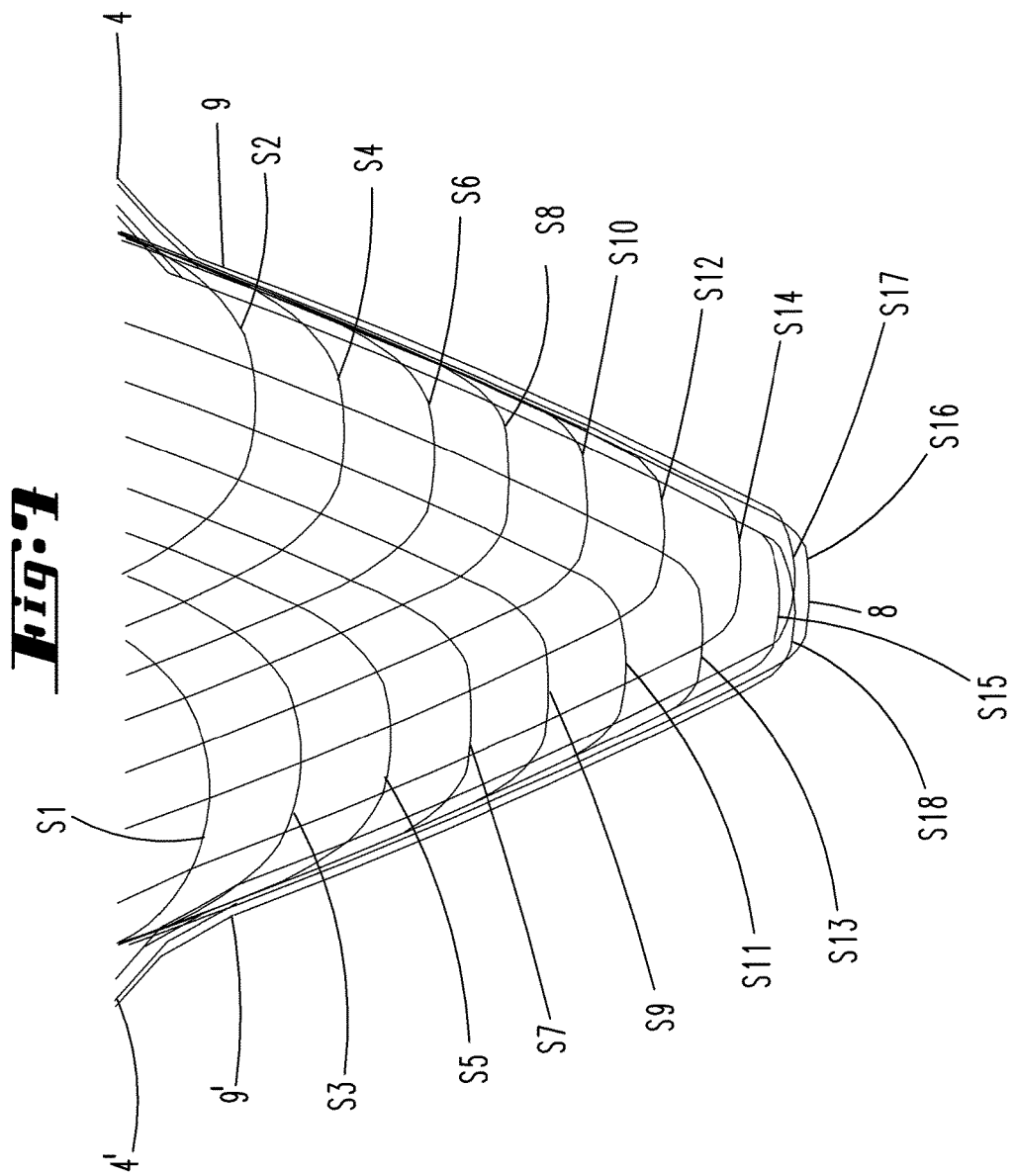
FIG. 7 shows an illustration similar to FIG. 5, wherein the base 8 of the tooth is in a pendulum-like infeed realized by changing the turning angle produced with the last rough-machining step S16 and only the tooth flanks 9, 9' are processed in the following finish-machining steps S17, S18.

FIG. 7 shows a method, in which a rough contour of a gearing is produced in successive rough-machining steps S1 to S16. In this case, steps S1, S3, S5, S7, S9, S11, S13 and S15 for producing the left tooth flank 9' respectively alternate with steps S2, S4, S6, S8, S10, S12 and S14 for producing the right tooth flank 9. The current base of the tooth is respectively cut deeper in each processing step S1 to S16. The turning angle relative to a zero position of the cutting tooth changes its preceding sign with each processing step S1 to S16. The absolute value of the turning angle is incrementally reduced until it reaches the value zero during the last rough-machining cut S16. The final position of the base 8 of the spacewidth is defined with this last rough-machining cut S16.

Two finish-machining cuts S17 and S18 are produced after the rough-machining cuts S1 to S16. The finish-machining cuts S17, S18 are produced with a reduced penetration depth of the cutting tooth into the already finished spacewidth such that the cutting edge of the cutting tooth does not engage into the already finished base 8 of the spacewidth. The right tooth flank 9 is processed with the finish-machining cut S17 and the left tooth flank 9' is processed with the finish-machining cut S18.

Figure 8:
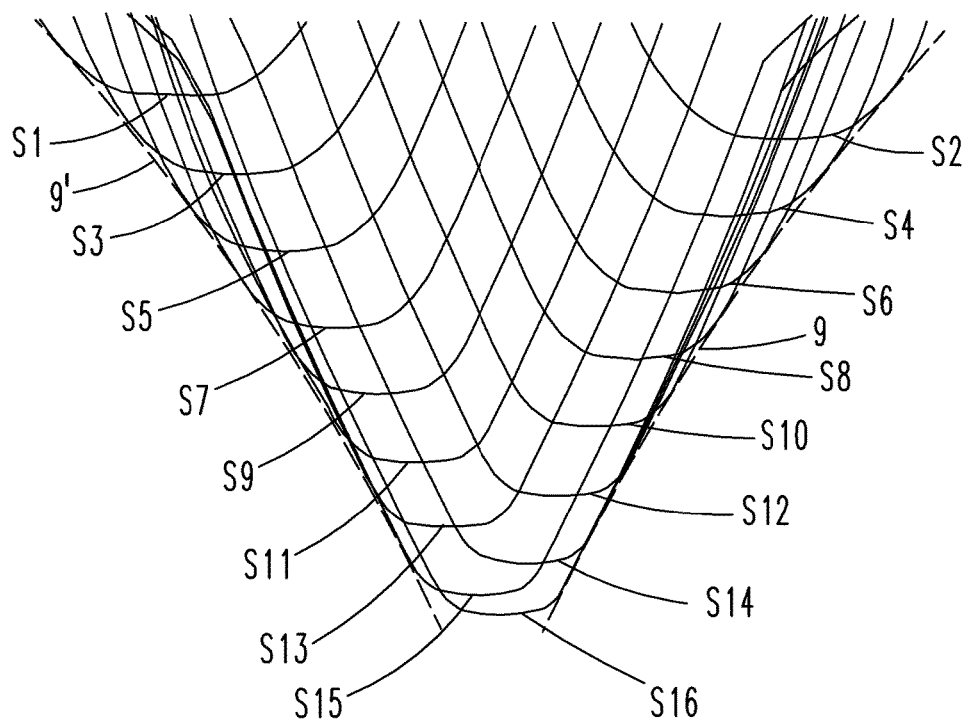
FIG. 8 shows an illustration similar to FIG. 5, wherein the turning angle is changed in such a way that a tooth flank 9, 9' lying in an involute surface or another specially defined contour is produced.

No finish-machining cut is produced in the exemplary embodiment illustrated in FIG. 8. In this figure, involute-shaped tooth flanks 9, 9' are indicated with broken lines. The infeed takes place in such a way that the sum of the tooth flank sections produced with the pendulum-like cuts S1 to S16 results in an involute tooth flank 9, 9'. However, not all intermediate steps are illustrated in this figure in order to provide a better overview. Furthermore, the deviation of the involute progression from the progression of the cutting edge is exaggerated in order to elucidate these circumstances. A special profile shape that deviates from an involute shape is also possible—as described above.

It is particularly proposed that at least 5 processing steps, preferably at least 10 processing steps, are carried out until the maximal penetration depth of the cutting teeth (3) into the spacewidths (7) is reached, wherein the cutting teeth have a different penetration depth into the spacewidths in each processing step, and wherein a last processing step is preferably carried out, in which the cutting teeth have the same penetration depth into the spacewidths as in the next-to-last processing step.

The preceding explanations serve for elucidating all inventions that are included in this application and respectively enhance the prior art independently with at least the following combinations of characteristics, namely:

A method, which is characterized in that the gearing is produced in several successive processing steps (S1 to S20), wherein the spacewidths (7) between the teeth to be produced are incrementally cut deeper with a feed motion having a component in the axial direction (10) of the workpiece spindle, and wherein the axial spacing between the tool spindle and the workpiece spindle and a turning angle ($\alpha 1$ to $\alpha 19$) between a fixed point such as, e.g., the center of the spacewidth (7) lying between a first and a second tooth flank (9, 9') and a fixed point on the cutting tooth (3) such as, e.g., its center is changed between the processing steps in such a way that a first cutting edge section (5") of the cutting tooth (3) engages on a tooth flank section of a first tooth flank (9) produced during a preceding processing step with an at least reduced material removal referred to other cutting edge sections (5', 5''') of this cutting tooth (3).

A method, which is characterized in that the turning angle ($\alpha 1$ to $\alpha 19$) is changed after a group of processing steps, preferably after each processing step, in such a way that a second cutting edge section (5"'), which differs from the first cutting edge section (5"), engages on a tooth flank section of the second tooth flank (9') with an at least reduced material removal referred to other cutting edge sections (5', 5") of this cutting tooth (3).

A method, which is characterized in that the absolute value of the turning angle ($\alpha 1$ to $\alpha 19$) is incrementally reduced whereas the preceding sign of the turning angle ($\alpha 1$ to $\alpha 2$) is changed after a group of processing steps (S1 to S20), preferably after each processing step.

A method, which is characterized in that the processing ends with a single finish-machining step, during which the turning angle is zero.

A method, which is characterized in that the processing ends with two successive finish-machining steps that are carried out with a minimal turning angle.

A method, which is characterized in that the axial spacing and/or the phase position is continuously varied during the one or at least one of the two finish-machining steps or in both finish-machining steps.

A method, which is characterized in that a processing step (S17, S18), in which only at least one tooth flank (9, 9') is processed, but not the base (8) of the tooth, is carried out at least after a processing step (S1 to S16), in which the spacewidth (7) is cut deeper, wherein this processing step (S17, S18), in which the spacewidth is not cut deeper, particularly is a finish-machining step.

A method, which is characterized in that the turning angle is changed between the successive processing steps (S1 to S20) in such a way that the tooth flank (9, 9') forms an involute surface or extends along another specially defined contour.

A method, which is characterized in that the material removal direction extends opposite to the feed direction in at least one processing step (S1 to S20), particularly in a finish-machining step.

A device, which is characterized in that the tool spindle (11) and the workpiece spindle (13) are positioned at an axial cross-angle ($\alpha$) relative to one another and the tool spindle (11) and the workpiece spindle (13) respectively can be rotationally driven by drives (12, 14), with a program-controlled control unit (15) for controlling the drives (12, 14) for the tool spindle (11) and the workpiece spindle (13), as well as for a feed motion with a component in the axial direction of the workpiece spindle (13) and an infeed in the direction of the axial spacing between the tool spindle (11) and the workpiece spindle (13), wherein the control unit is programmed in such a way that the drives (12, 14) of the tool spindle (11) and the workpiece spindle (13) are driven in a predefined speed ratio and the gearing is produced in several successive processing steps (S1 to S20), wherein the spacewidths (7) between the teeth to be produced are incrementally cut deeper with a feed motion having a component in the axial direction (10) of the workpiece spindle, and wherein the axial spacing between the tool spindle and the workpiece spindle and a turning angle ($\alpha 1$ to $\alpha 19$) between a fixed point such as, e.g., the center of the spacewidth (7) lying between a first and a second tooth flank (9, 9') and a fixed point on the cutting tooth (3) such as, e.g., its center is changed between the processing steps in such a way that a first cutting edge section (5") of the cutting tooth (3) engages on a tooth flank section of a first tooth flank (9) produced during a preceding processing step with an at least reduced material removal referred to other cutting edge sections (5', 5''') of this cutting tooth (3).

A device, which is characterized in that the control unit is programmed in such a way that the turning angle ($\alpha 1$ to $\alpha 19$) is changed after a group of processing steps, preferably after each processing step, in such a way that a second cutting edge section (5'''), which differs from the first cutting edge section (5"), engages on a tooth flank section of the second tooth flank (9') with an at least reduced material removal referred to other cutting edge sections (5', 5") of this cutting tooth (3).

A device, which is characterized in that the control unit (15) is programmed in such a way that the device operates in accordance with one or more of the process steps specified in the claimed invention.

A method, which is characterized in that only one of the two tooth flanks (9, 9') is essentially processed alternately in association with the incremental increase of the penetration depth.

A method, which is characterized in that the penetration depth is increased during each change of the tooth flank (9, 9') being processed except in the last processing step.

A control unit of a device for producing gears in gearwheels (6), which is programmed in such a way that the device operates in accordance with one of the methods specified in the claimed invention.

All disclosed characteristics are (separately) essential to the invention. The disclosure of the associated/attached priority documents (copy of the priority application) is hereby also fully integrated into the disclosure of the application, namely also for the purpose of incorporating characteristics of these documents into claims of the present application. The characteristic features of the dependent claims characterize independent inventive enhancements of the prior art, particularly in order to submit divisional applications on the basis of these claims.

What is claimed is:

1. A method for producing gear teeth in a gearwheel with a skiving wheel that features cutting teeth, the method comprising:
    rotationally driving a workpiece spindle about a rotational workpiece axis;
    receiving the gearwheel with the workpiece spindle;
    rotationally driving a tool spindle about a rotational tool axis, the tool spindle carrying the skiving wheel;
    positioning the tool spindle and the workpiece spindle relative to one another such that an axial cross-angle is defined between the rotational tool axis and the rotational workpiece axis;
    rotationally driving the tool spindle and the workpiece spindle in a predefined speed ratio relative to one another;
    producing the gear teeth in successive processing steps, the successive processing steps comprising:
        incrementally cutting deeper spacewidths into the gearwheel between the gear teeth;
        changing an axial spacing between the rotational tool axis of the tool spindle and the rotational workpiece axis of the workpiece spindle; and
        changing a turning angle defined between (A) a center axis of the corresponding spacewidth and (B) a line segment defined between (i) a first fixed point between a first tooth flank and a second tooth flank and (ii) a second fixed point on a cutting tooth of the skiving wheel, such that a first cutting edge section of the cutting tooth engages on a tooth flank section of a first tooth flank produced during a preceding processing step with an at least reduced material removal relative to other cutting edge sections of the cutting tooth, and further changing the turning angle such that a second cutting edge section of the cutting tooth, which differs from the first cutting edge section, engages on a tooth flank section of the second tooth flank with an at least reduced material removal relative to other cutting edge sections of the cutting tooth; and
    wherein the further changing the turning angle comprises:
        incrementally reducing an absolute value of the turning angle, and changing a preceding sign of the turning angle.

2. The method according to claim 1, wherein after completion of plural sets of the successive processing steps, a single finish-machining step is performed, during which the turning angle is zero.

3. The method according to claim 1, wherein after completion of plural sets of the successive processing steps, two successive finish-machining steps are carried out, during which the turning angle is greater than zero.

4. The method according to claim 3, wherein the axial spacing and/or the turning angle is continuously varied during at least one of the two finish-machining steps or in both of the two finish-machining steps.

5. The method according to claim 1, wherein a flank processing step, in which only at least one tooth flank is processed, but not the base of the tooth, is carried out at least after a processing step, in which the spacewidth is cut deeper into the gearwheel, wherein this flank processing step, in which the spacewidth is not cut deeper into the gearwheel, is a finish-machining step.

6. The method according to claim 1, wherein the changing of the turning angle is performed in such a way that the tooth flanks form an involute surface or extends along another specially defined contour.

7. The method according to claim 1, wherein a material removal direction extends opposite to a feed direction in a finish-machining step.

8. The method according to claim 7, and further comprising the step of providing a device for producing the gear teeth in the gear wheel, the device comprising the skiving wheel and the workpiece spindle, the device further comprising a control unit programmed in such a way that the device operates in accordance with said method for producing the gear teeth in the gear wheel.

9. The method according to claim 1, and further comprising the step of providing a device for producing the gear teeth in the gear wheel, the device comprising the skiving wheel and the workpiece spindle, the device further comprising a control unit programmed in such a way that the device operates in accordance with said method for producing the gear teeth in the gear wheel.

10. A method for producing gear teeth in a gearwheel with a skiving wheel that features cutting teeth, comprising:
    positioning the skiving wheel and a workpiece spindle to which the gearwheel is provided relative to one another such that an axial cross-angle is defined between a rotational axis of the skiving wheel and a rotational workpiece axis of the workpiece spindle;
    rotationally driving the gearwheel and the skiving wheel in a predefined speed ratio relative to one another;
    incrementally increasing a penetration depth of the cutting teeth into spacewidths of the gearwheel lying between two opposite tooth flanks of the gearwheel; and
    processing the tooth flanks in succession;
    wherein one of the two tooth flanks is processed with a first cutting edge section and the other tooth flank is respectively processed with a second cutting edge section in association with the step of incrementally increasing the penetration depth, the first cutting edge being longer than the second cutting edge.

11. The method according to claim 10, wherein the step of processing the tooth flanks in succession involves changing between processing of one of the two tooth flanks and processing of the other of the two tooth flanks; and wherein the penetration depth of the cutting teeth is incrementally increased during the changing between processing of one of the two tooth flanks and processing of the other of the two tooth flanks.

12. The method according to claim 11, and further comprising the step of providing a device for producing the gear teeth in the gear wheel, the device comprising the skiving wheel and the workpiece spindle, the device further comprising a control unit programmed in such a way that the device operates in accordance with said method for producing the gear teeth in the gear wheel.

13. The method according to claim 10, and further comprising the step of providing a device for producing the gear teeth in the gear wheel, the device comprising the skiving wheel and the workpiece spindle, the device further comprising a control unit programmed in such a way that the device operates in accordance with said method for producing the gear teeth in the gear wheel.

* * * * *